June 23, 1925.  1,543,115
J. B. LONG
LONG SWEEP ATTACHMENT FOR CULTIVATORS
Filed Sept. 2, 1924
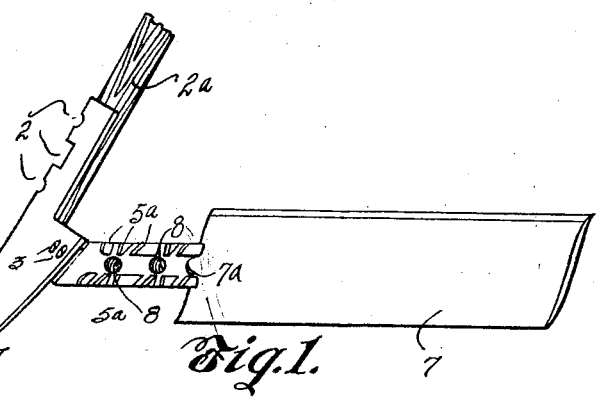
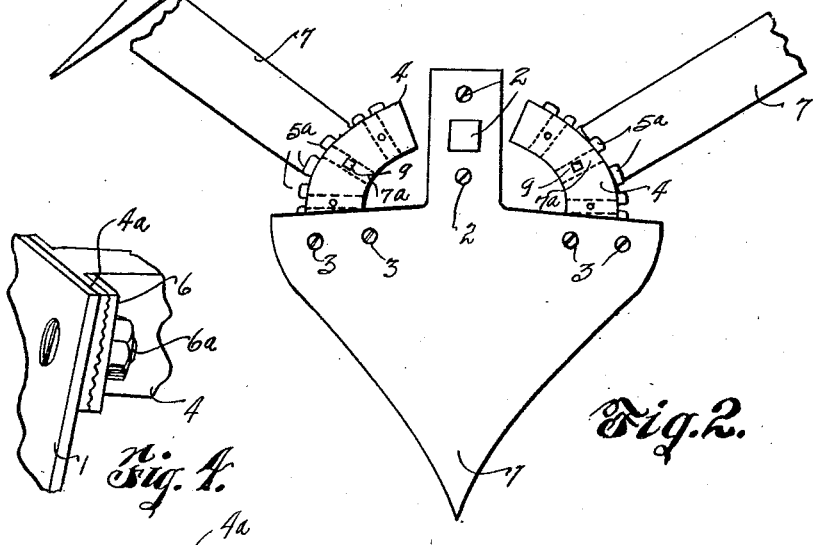
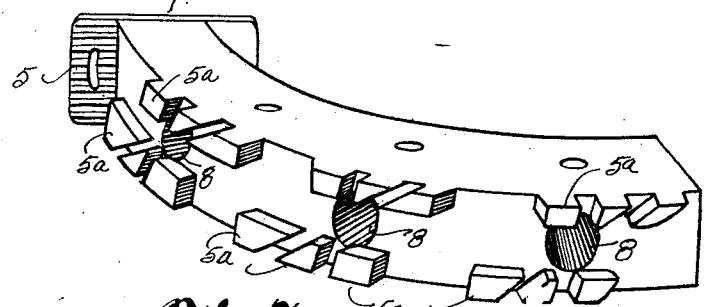
Joseph B. Long
INVENTOR.
BY John M. Spellman
ATTORNEYS.

Patented June 23, 1925.

1,543,115

UNITED STATES PATENT OFFICE.

JOSEPH B. LONG, OF CLEBURNE, TEXAS.

LONG-SWEEP ATTACHMENT FOR CULTIVATORS.

Application filed September 2, 1924. Serial No. 735,297.

*To all whom it may concern:*

Be it known that I, JOSEPH B. LONG, a citizen of the United States, residing at Cleburne, in the county of Johnson and State of Texas, have invented certain new and useful Improvements in Long-Sweep Attachments for Cultivators, of which the following is a specification.

This invention relates to agricultural implements and refers more particularly to a wing sweep attachment for plows, the primary object being to provide an attachment of this character, which will provide an effectual means for eliminating surplus vegetation, such as weeds, grass and the like between the rows of the vegetation being cultivated.

Another object of the invention is the provision of proper facilities for the adjustment of the device in as simple a manner as possible, and the elimination of all non-essential details.

Features of the invention lie in the compact, simple and durable construction, and the manner in which the blades may be adjusted to conform with the respective requirements of the invention.

Further objects, features and advantages will be brought out in the course of the following description, the accompanying drawings being supplemental thereto and wherein:

Figure 1 represents a side elevational view of the invention,

Figure 2 represents a top or plan view,

Figure 3 is a detail view of one of the wing sweep guides, showing the various adjustments provided thereon, and Figure 4 represents a detail view showing the corrugated lock washer.

In carrying out the detailed description of the invention, similar characters of reference are used throughout the different views, wherein the plow share 1, having spaced apertures 2 in the tongue thereof, for its rigid attachment to the foot 2ª, is provided with additional apertures 3—3 for its pivotal attachment of a pair of semi-U shaped members 4—4, one of which is shown in detail in Figure 3.

It will be noted in this figure that the member 4 is provided with a head 4ª adapted to conform with the contour of the inner surface of the plow share. The head is pivoted on the inner side and has an elongated semi-circular slot 5 on the outside edge. This feature provides the necessary adjustment for the raising and lowering of the wing sweeps hereinafter described.

One side of this head 4ª is suitably corrugated, as shown in Figures 3 and 4, to conform with like corrugations on a washer 6, interposed between the head 4ª and nut 6ª, as shown in detail in Figure 4.

Around the outer periphery of the members 4—4, are provided spaced lugs 5ª—5ª, whose function will be later described.

A pair of double bladed wings sweeps 7—7, provided with an extension or neck 7ª, which neck is adapted to be placed in either of the apertures 8—8 and held rigid therein by a set screw 9, as in Figure 2, the greater portion of its rigidity, however, is brought about by its interposition between the lug 5ª, heretofore mentioned, as it will be seen that due to the latter's position, a channel is provided over the center of the apertures 8, the width of which channel is approximately the thickness of the wing sweep blades 7.

Therefore, it will be observed that all available adjustments are provided, which may readily be made in a minimum of time, which adjustments include the widening and narrowing of the sweep by the replacing of the sweeps 7 in the various apertures 8 provided around the periphery of the member 4, also the desired angles to which the sweeps are adapted to enter the soil. This latter adjustment is brought about by means of the semi-circular slot 5.

The angle to which the blades may be set to provide for uniform depth of the entry of the blades into the soil is established by the peculiar arrangement of the lugs 5ª.

In view of the above, it is obvious that it is the intention as shown by the construction of this invention to provide a simple attachment of this character, every adjustment of which may be made with the use of only a common screw driver, and it is not desired that the invention should be limited to the specific disclosure herein described and that minor changes may be resorted to as fall within the scope of what is herein claimed.

I claim:

1. A wing sweep attachment for plows, having in combination with a plow share, a pair of inwardly curved members in limited pivotal attachment to each rear upper side of the plow share, a plurality of spaced apertures cut through each of said members, said apertures adapted to receive wing sweep shafts, and projections arranged on the members to hold the wing sweeps at the desired angular adjustment, and set screws adapted to be tightened upon the wing sweep shafts to hold them within the apertures of the members.

2. In a wing sweep attachment for plow shares, interchangeable wing sweeps, curved wing sweep supporting members in limited pivotal attachment to the rear of each side of the plow share, said members curving backward and inward toward one another, means in each of said members adapted to receive the wing sweep shafts, and means on the members to secure the shafts in rigid attachment at desired angles.

3. In attachment for plows, wing sweeps, curved members in limited pivotal attachment to the plow share, spaced apertures in said members to receive the wing sweep shafts, lugs on the members to set the angles of the sweeps and means of rigidly securing the said sweeps in the apertures of said members.

In testimony whereof I have signed my name to this specification.

JOSEPH B. LONG.